US009236812B2

(12) United States Patent
White et al.

(10) Patent No.: US 9,236,812 B2
(45) Date of Patent: Jan. 12, 2016

(54) UNIVERSAL AC TO DC CONVERTER

(71) Applicant: Hamilton Sundstrand Corporation, Charlotte, NC (US)

(72) Inventors: Adam Michael White, Belvidere, IL (US); Waleed M. Said, Rockford, IL (US); Mustansir Kheraluwala, Lake Zurich, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 108 days.

(21) Appl. No.: 14/148,967

(22) Filed: Jan. 7, 2014

(65) Prior Publication Data

US 2015/0194905 A1 Jul. 9, 2015

(51) Int. Cl.
*H02M 7/217* (2006.01)
*H02M 7/21* (2006.01)
*H02M 7/06* (2006.01)
H02M 1/00 (2007.01)
H02M 7/219 (2006.01)
H02M 1/10 (2006.01)
H02M 3/28 (2006.01)

(52) U.S. Cl.
CPC ............. *H02M 7/2173* (2013.01); *H02M 7/06* (2013.01); *H02M 7/21* (2013.01); *H02M 7/217* (2013.01); *H02M 1/10* (2013.01); *H02M 3/285* (2013.01); *H02M 7/219* (2013.01); *H02M 7/2176* (2013.01); *H02M 2001/0074* (2013.01); *H02M 2001/0083* (2013.01)

(58) Field of Classification Search
CPC ............. H02M 2001/0074; H02M 2001/0083; H02M 7/2173; H02M 7/2176; H02M 7/219
See application file for complete search history.

(56) References Cited

U.S. PATENT DOCUMENTS

| 6,054,674 | A | * | 4/2000 | Moriguchi et al. | 219/130.21 |
| 6,269,015 | B1 | * | 7/2001 | Ikeda et al. | 363/142 |
| 6,385,057 | B1 | * | 5/2002 | Barron | 363/17 |
| 2010/0296319 | A1 | | 11/2010 | Liu et al. | |

FOREIGN PATENT DOCUMENTS

| JP | S55131272 | 10/1980 |
| WO | 2013093963 | 6/2013 |

OTHER PUBLICATIONS

European Search Report dated May 19, 2015 in European Application No. 15150255.6.

* cited by examiner

*Primary Examiner* — Fred E Finch, III
*Assistant Examiner* — Rafael O. De Leon Domenech

(57) ABSTRACT

A universal AC to DC converter may be configured to convert alternating current (AC) to direct current (DC), such as for use in aerospace applications. The disclosure relates to a single universal power electronic converter capable of converting an AC input voltage, such as a line to neutral input voltage of either 115 Vrms or 230 Vrms nominal to 28 V DC.

15 Claims, 4 Drawing Sheets

UNIVERSAL AC TO DC CONVERTER

FIELD

The present disclosure relates to the electronic conversion of alternating current (AC) to direct current (DC).

BACKGROUND

In aerospace applications, three phase AC is typically distributed at a nominal line to neutral voltage of either 115 Vrms or 230 Vrms. Traditionally, 28V DC power electronic converters are designed for a specific nominal system input voltage. Different power converters are designed for 115 Vrms systems and for 230 Vrms systems.

SUMMARY

The present disclosure relates to a universal AC to DC converter. The universal AC to DC converter may include a three phase alternating current signal coupled to a rectifier. The rectifier converts the AC signal into a DC signal. The DC output of the rectifier may be electrically coupled to a switching system. The output of the rectifier may be configured to toggle between a series or parallel connection to a plurality of DC to DC converters.

A method for converting AC input voltage to a DC voltage is described herein. The method may comprise receiving, via an input coupled to a rectifier, a three phase AC signal. The method may comprise converting the AC signal to a DC signal. The method may comprise sensing the line to neutral AC input voltage. The output of the rectifier may be electrically coupled to a DC to DC converter. The method may comprise switching, via a switching system, the output of the rectifier from a coupling in parallel to a coupling in series based on the sensed line to neutral AC input voltage. The method may comprise delivering the output of the rectifier to the DC to DC converter.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step.

Figure 1:
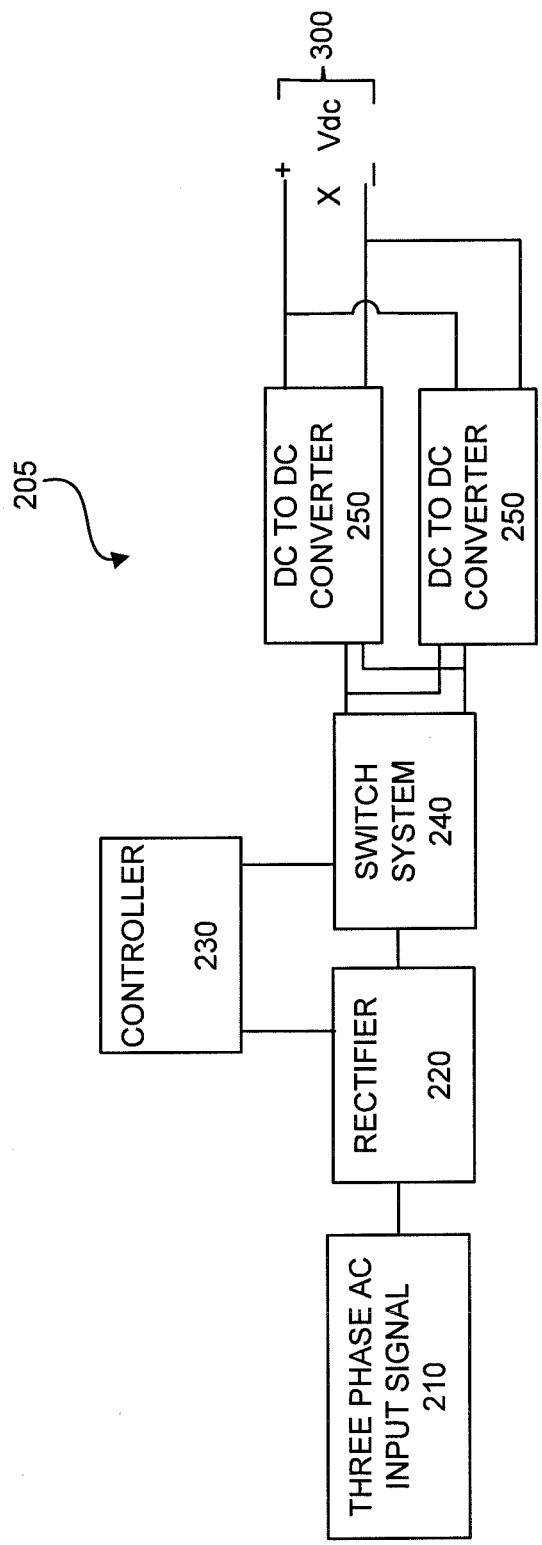
FIG. 1 depicts a high level universal AC to DC converter, in accordance with various embodiments.

In accordance with various embodiments, with reference to FIG. 1 a high level block diagram of the circuit described herein is depicted. For instance, a three phase AC input signal 210 is delivered to the universal AC to DC converter 205. Three phase AC input signal 210 is received by a rectifier 220. Rectifier 220 may be any rectifier configured to convert alternating current to direct current through rectification. The rectifier 220 may be a Vienna rectifier, such as Vienna rectifier 120 or a passive rectifier (such as a three wire rectifier). The rectifier 220 may be controlled by a controller 230 and/or control circuitry. A switching system 240 may be coupled to the controller 230 to control the operational mode of the switching system 240. Switching system 240 may be any switching system.

Figure 2:
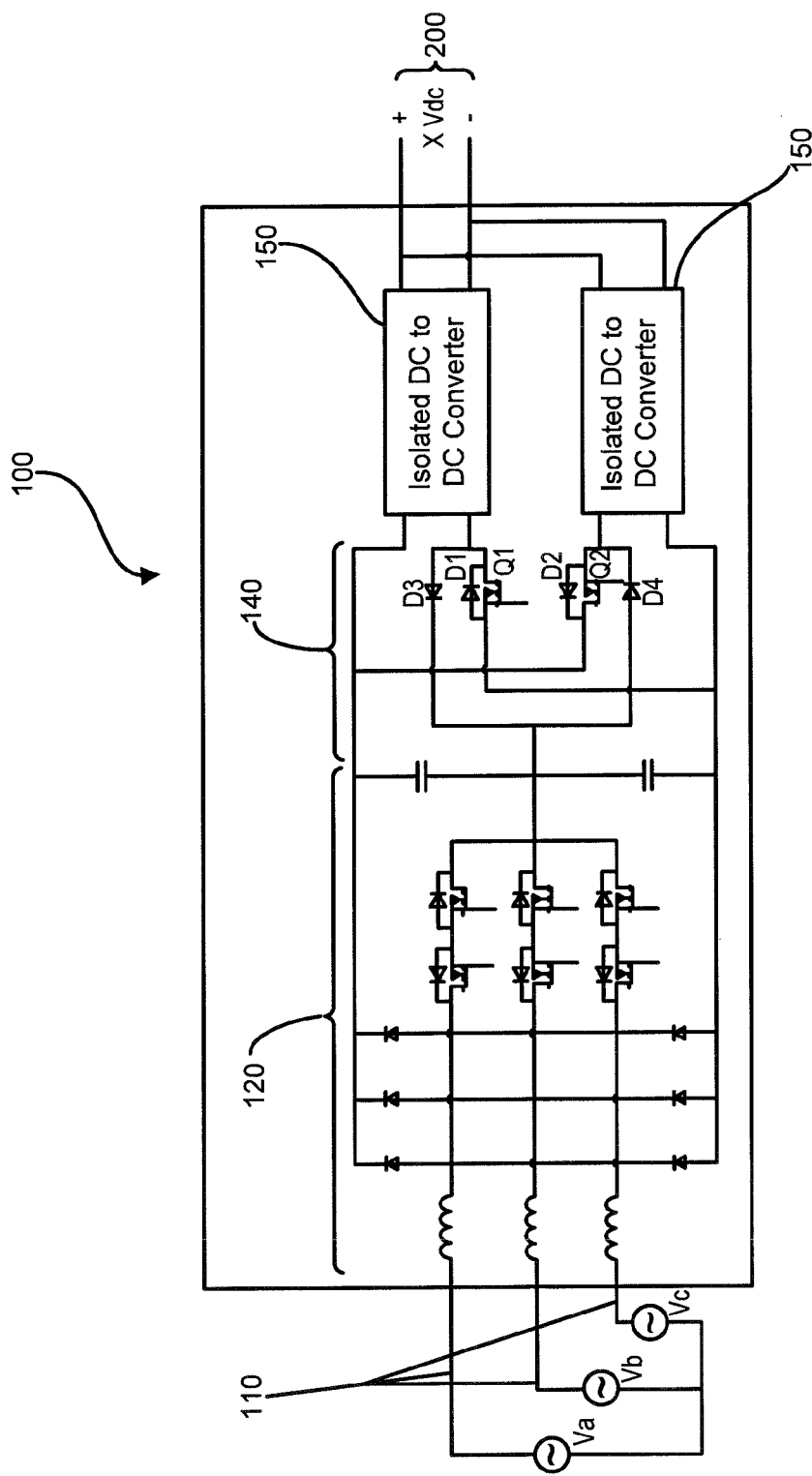
FIG. 2 is a representative circuit diagram of a universal AC to DC converter, in accordance with various embodiments.

According to various embodiments, and with reference to FIG. 2, a universal AC to DC converter 100 is depicted. AC to DC converter 100 may be configured to convert alternating current (AC) to direct current (DC), such as for use in aerospace applications. As previously noted, in aerospace applications, three phase AC power is typically distributed at a nominal line to neutral voltage of either 115 Vrms or 230 Vrms. Transformer rectifier units (TRUs) or power electronic converters are used to convert a portion of this AC power to 28V DC power, as utilized by many of the aircraft electrical loads. Various embodiments of the present disclosure relate to a single universal power electronic converter capable of converting an AC input voltage, such as a line to neutral input voltage of either 115 Vrms or 230 Vrms nominal to 28 V DC. According to various embodiments, the input side of isolated DC to DC converters 150 described may be controlled to be connected in parallel or series depending on the AC input voltage and a desired output nominal voltage value "X" Vdc 200. In this way, a single part having dual functionality may be designed and manufactured rather than relying on multiple discrete elements to perform two tasks. The output of the switching system 240 may be coupled to one or more DC to DC converters 250. The output of the DC to DC converters may be the output of the system 300 "X" Vdc. Though a 28 Vdc system is described herein, the value of X can be tuned based on application requirements. The DC to DC converter 250 may be a high voltage to low voltage DC to DC converter.

As described in greater detail below, a power electronic three phase AC to DC, such as 28 Vdc, converter may automatically detect if it is connected to an electrical power system, such as a 115 V or 230 V input power system and the internal circuitry is reconfigured to match the detected input voltage. The converter is able to produce the same output DC power at a given voltage (e.g., 28V) in response to connection to either a 115 V or 230 V AC source and need not be de-rated for reduced power in either scenario.

In accordance with various embodiments, with continued reference to FIG. 2, the structure of the universal AC to DC converter is depicted. Power supplied to three phase input 110 to the AC to DC converter 100 is converted to 3-wire DC power with a Vienna rectifier 120. A Vienna rectifier 120 may comprise a unidirectional three-phase, three-level switching pulse-width modulation (PWM) rectifier. It is effectively a three-phase diode bridge comprising an integrated voltage-boost converter. The Vienna rectifier 120 may be controlled by a controller (not shown) comprising a memory and control logic. The output of the Vienna rectifier 120 is connected to a configuration switching stage 140. Control of the switching devices (such as metal-oxide-semiconductor field-effect transistors, insulated-gate bipolar transistors, or contactors) in the configuration switching stage 140 may be configured such that the input of the two isolated DC to DC converters 150 are connected to the configuration switching stage 140 in either series or parallel. As described in further detail below, whether the output of the DC to DC converters is connected in parallel or series, the output power of the overall universal converter may be twice the rated power of each individual DC to DC converter.

Figure 3A:
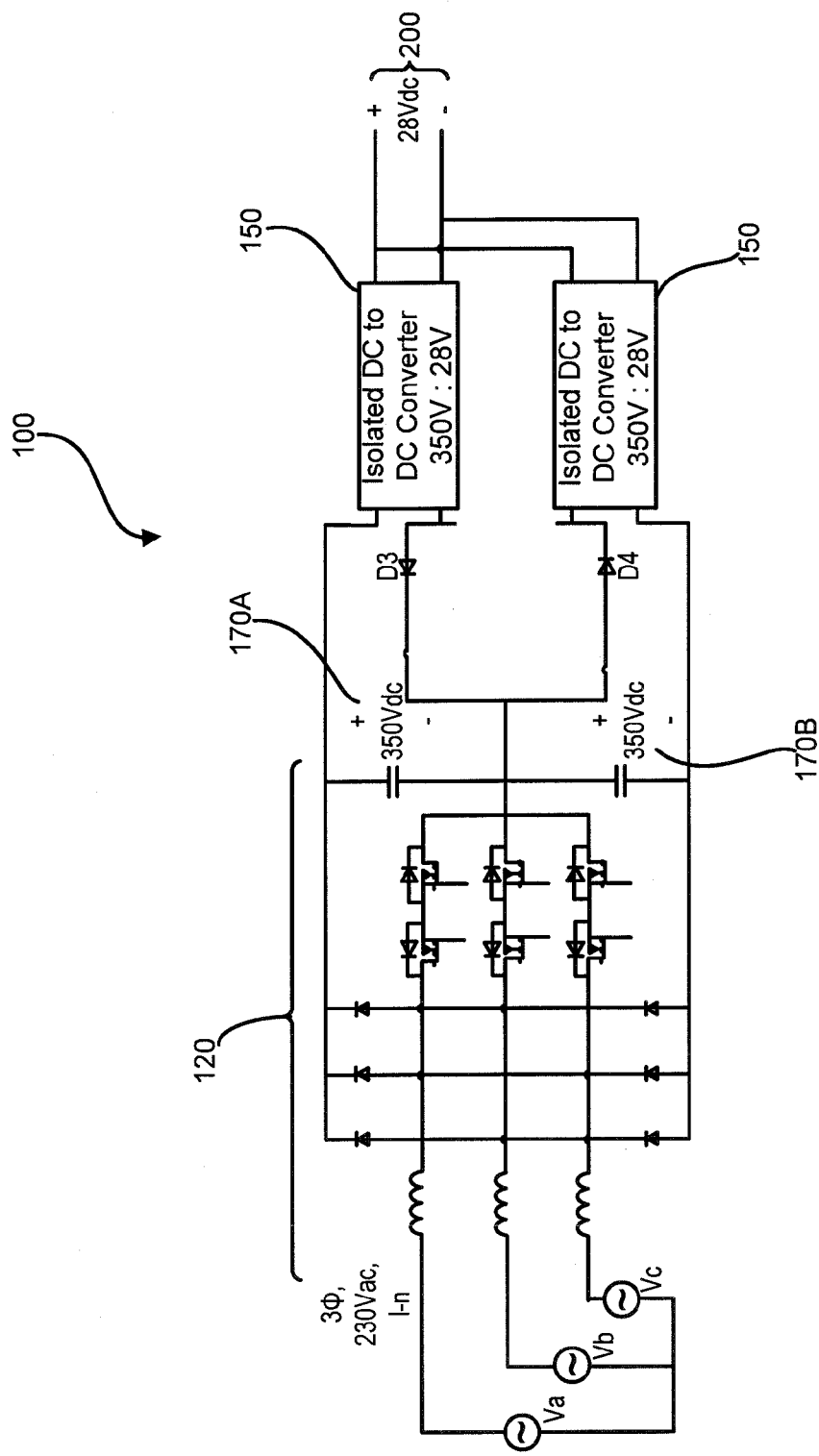
FIG. 3A depicts the circuit of FIG. 2 effectively configured for 230 Vac Input, in accordance with various embodiments.

In accordance with various embodiments, with reference to FIG. 3A, a configuration of the AC to DC converter 100 in the 230 Vac input configuration is shown. Switches Q1 and Q2 as depicted in FIG. 2 are gated off and not shown for clarity. Diodes D3 and D4 are forward biased and conducting, therefore the two isolated DC to DC converter 150 inputs are connected in series. The DC to DC converter 150 utilized may be any suitable DC to DC converter configured to convert from one DC voltage level to another. For instance, with the 230V AC input the Vienna rectifier 120 could be controlled to boost to 700 VDC output (from high rail 155 to low rail 125). Each DC to DC converter 150 would thus see a 350 Vdc input 170A, 170B (one half of the Vienna Rectifier 120 high rail 155 to low rail 125 output voltage of 700 Vdc. According to various embodiments, this configuration is the default configuration (i.e. the configuration without any control power applied to the converter). The default series connection protects the input to the DC to DC converters 150, since the default DC to DC converter 150 input voltage does not exceed one half of the Vienna Rectifier 120 high rail 155 to low rail 125 output voltage.

Figure 3B:
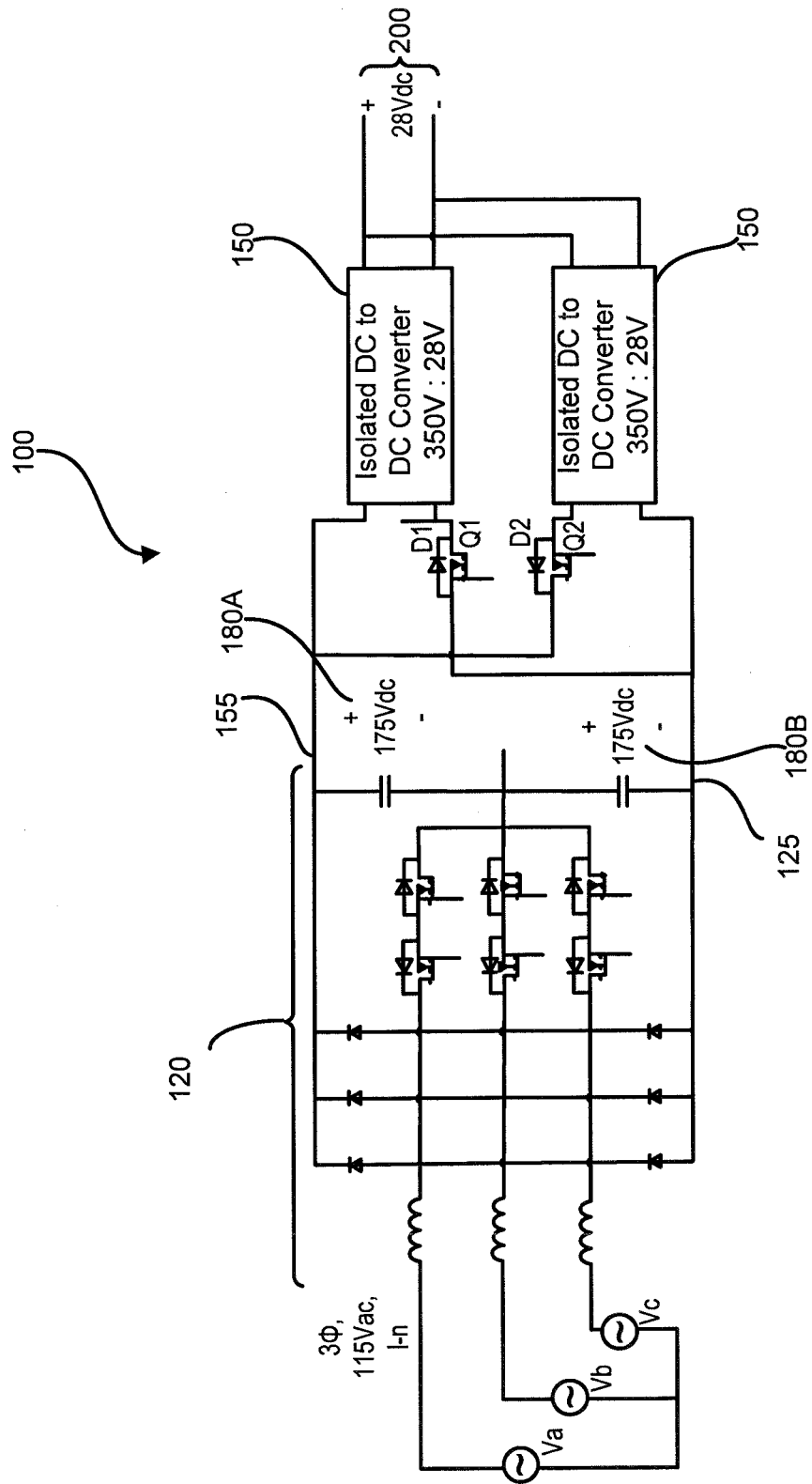
FIG. 3B depicts the circuit of FIG. 2 effectively configured for 115 Vac input, in accordance with various embodiments.

In accordance with various embodiments, with reference to FIG. 3B a configuration of the AC to DC converter 100 in the 115 Vac input configuration is shown. Here switches Q1 and Q2 are gated on and conducting. Diodes D3 and D4, as depicted in FIG. 1 are reverse biased and off (not shown from FIG. 2B for clarity). This configuration connects the DC to DC converter 150 input stages 180A, 180B in parallel, across the entire high rail to low rail output voltage of the Vienna Rectifier 120. Each DC to DC converter 150 therefore has a 350 Vdc input, which matches the input voltage to the DC to DC converters 150 in the 230 V case (as depicted in FIG. 2A). According to various embodiments, the effective circuit depicted in FIG. 3B is the default condition.

In operation, AC to DC converter 100 may be designed such that its default operational condition is to operate effectively as the circuit depicted in FIG. 3A. Upon a controller (not shown) sensing that 115 volt AC three phase input 110 is being delivered to the AC to DC converter 100 switches Q1 and Q2 may be toggled from an OFF status to an ON status to allow conducting through their path. As depicted in FIG. 1, the controller may be coupled to and/or integrated with the controller of the Vienna rectifier 120 or a stand-alone controller in electrical communication with the configuration switching stage 140. In response to Q1 and Q2 being toggled to an ON status, the AC to DC converter 100 may operate effectively as the circuit depicted in FIG. 3B.

In accordance with various embodiments, though, the configuration switching stage 140 depicted in FIGS. 1 through 3B is depicted with switches, it should be appreciated that this switching may be accomplished through a relay, such as solid state relay. Moreover, switches Q1 and Q2 may be implemented via a controllable power semiconductor device, such as a metal-oxide-semiconductor field-effect transistor (MOSFET), bipolar junction transistor (BJT), an insulated-gate bipolar transistor (IGBT), thyristor, and/or the like. A circuit operating similar to the circuit of FIG. 3A may represent a first condition where a circuit operating similar to the circuit of FIG. 3B may represent a switched to/relayed to second condition. In this way, a switching, such as an automatic switching may be controlled such that the input side of the isolated DC to DC converters 150 are connected in one of parallel or series.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more."

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A universal alternating current (AC) to direct current (DC) converter comprising:
   a rectifier coupled to a three phase AC input and configured to convert an AC current into a DC current that is output to a high rail, a low rail, and a neutral rail, and to accommodate varying three phase AC input voltages;
   a first DC to DC converter and a second DC to DC converter; and a switching system including:
- a first reverse oriented diode coupled between the neutral rail and the first DC to DC converter,
- a first forward oriented diode and a first switch connected in parallel between the low rail and the first DC to DC converter,
- a second forward oriented diode coupled between the neutral rail and the second DC to DC converter, and
- a second reverse oriented diode and a second switch connected in parallel between the high rail and the second DC to DC converter;

wherein the first DC to DC converter and the second DC to DC converter are connected in series in response to the first switch and the second switch being in an off configuration and the first DC to DC converter and the second DC to DC converter are connected in parallel in response to the first switch and the second switch being in an on configuration.

2. The universal AC to DC converter of claim 1, further comprising a controller in electrical communication with the rectifier to control the operation of the rectifier.

3. The universal AC to DC converter of claim 1, further comprising a controller in electrical communication with the switching system to control the operation of the switching system.

4. The universal AC to DC converter of claim 1, wherein the switching system has a default setting in which the first DC to DC converter and the second DC to DC converter are connected in series.

5. The universal AC to DC converter of claim 1, wherein the rectifier is a Vienna rectifier.

6. The universal AC to DC converter of claim 1, wherein the nominal line to neutral input voltage is at least one of 115 Vrms or 230 Vrms.

7. The universal AC to DC converter of claim 6, wherein the universal AC to DC converter can accommodate both a 115 Vrms and 230 Vrms nominal input voltage without being de-rated.

8. The universal AC to DC converter of claim 1, wherein the first DC to DC converter and the second DC to DC converter are high voltage to low voltage DC to DC converters.

9. The universal AC to DC converter of claim 1, wherein the first switch is at least one of a field-effect transistor, an insulated-gate bipolar transistor, a bipolar junction transistor or a solid state relay.

10. A method of converting input AC voltage to a DC voltage, the method comprising:
- receiving, via an input coupled to a rectifier, a three phase AC voltage;
- converting, via the rectifier, the three phase AC voltage to a DC voltage;
- outputting, via the rectifier, the DC voltage to a high rail, a low rail, and a neutral rail;
- determining, via a controller, the input AC voltage;
- switching, via a switching system, the output of the rectifier to a first DC to DC converter and a second DC to DC converter based upon the sensed input AC voltage; and
- delivering the output of the rectifier to the first DC to DC converter and the second DC to DC converter, wherein the switching system includes:
- a first reverse oriented diode coupled between the neutral rail and the first DC to DC converter,
- a first forward oriented diode and a first switch connected in parallel between the low rail and the first DC to DC converter,
- a second forward oriented diode coupled between the neutral rail and the second DC to DC converter, and
- a second reverse oriented diode and a second switch connected in parallel between the high rail and the second DC to DC converter, wherein the first DC to DC converter and the second DC to DC converter are connected in series in response to the first switch and the second switch being in an off configuration and the first DC to DC converter and the second DC to DC converter are connected in parallel in response to the first switch and the second switch being in an on configuration.

11. The method of claim 10, wherein the first switch includes at least one of a field-effect transistor, an insulated-gate bipolar transistor, a bipolar junction transistor or a solid state relay.

12. The method of claim 10, wherein the input AC voltage comprises a line to neutral input voltage of at least one of 115 Vrms or 230 Vrms.

13. The method of claim 10, wherein the first DC to DC converter and the second DC to DC converter are high voltage to low voltage DC to DC converters.

14. The method of claim 10, wherein the rectifier is at least one of a Vienna rectifier or a passive rectifier.

15. The method of claim 10, wherein the rectifier includes a universal AC to DC converter and the universal AC to DC converter can accommodate both a 115 Vrms and 230 Vrms input voltage without being de-rated.

* * * * *